US005740762A

United States Patent [19]
Bennett

[11] Patent Number: 5,740,762
[45] Date of Patent: Apr. 21, 1998

[54] MODULAR SHELTER ASSEMBLY FOR BIRDS

[75] Inventor: Phillip D. Bennett, Mansfield, Mo.

[73] Assignee: Stamina Products, Inc., Springfield, Mo.

[21] Appl. No.: 818,975

[22] Filed: Mar. 14, 1997

[51] Int. Cl.⁶ .......................... A01K 31/00; A01K 39/00
[52] U.S. Cl. ........................................................ 119/428
[58] Field of Search .............................. 119/52.1, 52.2, 119/54, 57.8, 428, 429, 430, 431

[56] References Cited

U.S. PATENT DOCUMENTS

| | | |
|---|---|---|
| 3,295,498 | 1/1967 | Brown . |
| 3,496,913 | 2/1970 | Vail . |
| 3,804,066 | 4/1974 | Lowe . |
| 4,632,061 | 12/1986 | Tucker et al. . |

*Primary Examiner*—Thomas Price
*Attorney, Agent, or Firm*—Cushman Darby & Cushman IP Group of Pillsbury Madison & Sutro LLP

[57] ABSTRACT

A multi-compartment bird shelter that may be assembled with a minimum of mechanical fasteners and which may be assembled as a multi-tiered structure is disclosed. The shelter is supported, by a support flange, on a vertical pole and includes a plurality of individual compartment modules that are pie shaped with vertical divergingly spaced walls and a bottom surface. A spacer element place coaxially over the pole is larger than the pole so as to define a gap between the pole and the spacer element. The spacer element rests upon the support flange, and individual compartment modules are coupled to the pole by inserting a hook structure of the module into the gap defined between the pole and the spacer element. A plurality of like sized and shaped modules are arranged around the pole in side-by-side fashion and are similarly coupled to the pole so as to define a tier of compartments. Subsequent tiers of compartments may be similarly assembled atop existing tiers. A roof structure is place over the topmost tier with the pole extending through a hole in the center of the roof. The roof structure secures the shelter in place and is itself held in place with a removable clamp that is attached to the pole above the roof. According to one feature of the disclosed shelter, individual compartment modules may be converted between a bird house configuration and a bird feeder configuration by coupling appropriate front panels to the front of the compartment module.

6 Claims, 10 Drawing Sheets

MODULAR SHELTER ASSEMBLY FOR BIRDS

FIELD OF THE INVENTION

The present invention relates to a modular shelter assembly for birds, and specifically to a shelter for birds composed of a plurality of individual compartment modules which may be assembled into one or more tiers of individual compartments without the need for mechanical fasteners and which can be assembled and disassembled with a minimal number of tools.

DESCRIPTION OF THE RELATED ART

Bird houses and bird feeders are common and enjoyable additions to any backyard. A particularly common type of bird house are those built for purple martins. Because martins are gregarious creatures, such bird houses typically include several tiers of nesting compartments. Current structures available for use as purple martin houses come in a variety of designs, but cleaning and maintaining these structures has always been laborious, time consuming, and many times an impossibility. Consequently, the individual dwelling compartments often become unhabitable for martins. Accordingly, it is desirable to provide a bird shelter structure that is easily maintained, assembled, and disassembled with a minimum number of tools.

Another problem with bird houses, and especially purple martin houses, is that after the desirable birds' nesting season is over and it leaves the bird house, it is not uncommon for other undesirable species of birds to build nests in the nesting compartments, thereby requiring additional cleaning and maintenance after the undesirable birds have left. Therefore, an advantageous design of a bird structure would permit the structure to be easily converted to a bird feeder at the end of the purple martin nesting season, thus precluding other birds from nesting in the nesting compartments.

A variety of modular and/or convertible build shelters are known in the prior art.

For example, Tucker et al., U.S. Pat. No. 4,632,061 discloses a modular bird feeder design. A plurality of individual bird feeder modules are arranged in a circular configuration about a central support member that may be either hung from above or supported from below, as by a vertical pole. The individual bird feeder modules are slotted at the inward bottom edge thereof so as to be cooperable with a mating hub. The upper outward edges of the individual modules are retained in their desired position by an abutment formed on the underside of a roof structure that covers the modules. Each individual module is installed by sliding it at an angle upwardly beneath the roof and then bringing it straight down until the slotted inner edge of the module engages a mating ridge of the hub. The bird feeder disclosed in Tucker '061 is not convertible into a bird house, nor does it provide for stacking of multiple tiers of individual bird dwellings.

Vail, U.S. Pat. No. 3,496,913 discloses a multilevel bird house having a plurality of nesting compartments per level, or tier. Access to the nesting compartments is achieved by removal of front panels attached to each nesting compartment. Each front panel is secured to the nesting compartment by integrated clips. The dividing walls which define the individual compartments, and the panels which separate the several levels of nesting compartments are all held in place by screws or other mechanical fasteners. Accordingly, the bird house disclosed in Vail would not provide for easy assembly or disassembly of the structure, or the easy addition or removal of tiers of compartments. In addition, Vail does not disclose shelter that is convertible to a bird feeder.

Lowe, U.S. Pat. No. 3,804,066 discloses a multilevel bird house having a plurality of nesting compartments per level. Each level of nesting compartments is defined by a rectangular outer box-like structure. Individual nesting compartments are formed by sliding an assembly of interconnected walls into the rectangular outer box structure. A floor structure, having a size larger than that of the outer box structure is disposed beneath the outer box structure. A plurality of thusly constructed levels may be stacked one upon the other. A roof structure is held in place by a plurality of screws which extend through outer flanges of the roof structure down through each of the individual levels of nesting compartments and are held in place by appropriate nuts turned onto the bolts below the bottommost level of nesting compartments.

Brown, U.S. Pat. No. 3,295,498 discloses a convertible bird house/bird feeder. Specifically, a panel can be positioned in a first slot to form a bird house and can be positioned in a second slot to form a bird feeder. The assembly is secured by separate mechanical fasteners. Notably, however, Brown does not disclose a multi-compartment or multilevel bird shelter that is convertible to a multilevel bird feeder.

Accordingly, the need exists for a multi-compartment shelter structure that may be converted between a bird feeder and a bird dwelling which is easy to maintain, assemble and disassemble.

SUMMARY OF THE INVENTION

The object of the present invention is to provide a modular bird shelter that is easily assembled and disassembled into one or more tiered assembly of individual shelter compartments. This and other objects are accomplished by providing a modular bird shelter comprising: a substantially vertical elongated support member, a shelter which includes a plurality of compartment modules having respective inner and outer ends supported on the elongated support member and arranged in side by side fashion around a periphery of the elongated support member with the outer ends of the modules facing radially outwardly from the elongated support member so as to define one or more tiers of compartments; a shelter supporting element constructed and arranged to be attachable to the elongated support member so as to support the shelter on the elongated support member when the shelter supporting element is attached to the elongated support member; a compartment module mounting structure, the compartment module mounting structure comprising: a spacer element associated with each tier of the one or more tiers of compartments, the spacer element being constructed and arranged to fit around the elongated support member so as to define a peripheral space between an inner surface of the spacer element and an outer surface of the elongated support member; and a support hook extending radially inwardly from an upper portion of the inner end of each compartment module, each of the support hooks being constructed and arranged to be disposed downwardly within the peripheral space to couple each compartment module between the spacer element and the elongated support member so that the outer end of each compartment module extends radially outwardly from the elongated support member; a roof structure defining a hole through a center portion thereof through which the elongated support member extends, the roof structure being constructed and arranged to cover a top-most tier of the one or more tiers of compartments and to retain the one or more tiers of compartments on the elongated support member; and a roof member retaining element constructed and arranged to be attachable to the elongated support member above the roof structure and constructed and arranged to retain the roof structure in a position to cover the top-most tier and to retain the one or more tiers on the elongated support member when the roof member retaining element is attached to the elongated support member.

These and other objects of the present invention will become more apparent during the course of the following detailed description and appended claims. The invention may best be understood with reference to the accompanying drawings wherein an illustrative embodiment is shown.

DETAILED DESCRIPTION OF THE PREFERRED EMBODIMENT

Figure 1:
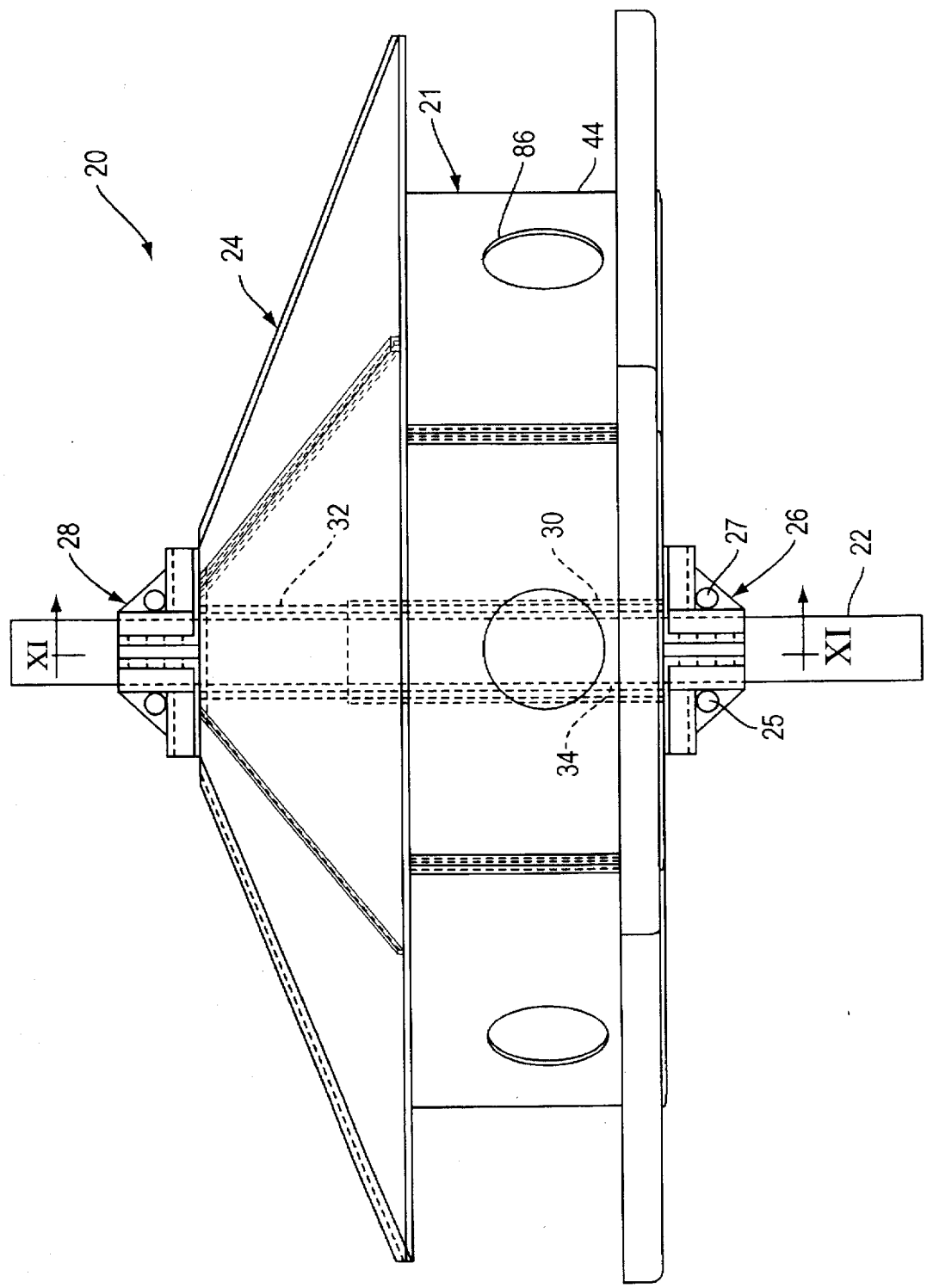
FIG. 1 is an elevational view of a modular bird shelter assembly according to the present invention, configured as a multi-compartment, single tier bird house.

A modular bird shelter 20 of the present invention, configured as a multi-compartment, single-tiered bird house, is shown in FIG. 1. Vertical pole 22, which functions as a vertical support member for the shelter, may itself be supported by and extend from the ground or may be supported by and suspended from a structure located above. For certain bird species, such as purple martins for example, it is preferred that the pole extend upwardly from and be supported by the ground. Pole 22 is preferably a one piece pole but may alternatively be made up of a plurality of interfitting segments. In a preferred embodiment, a pair of radially extending flanges, or wings, (not shown) disposed along a short length of pole 22 are provided near the end of the pole that is inserted into the ground to give the pole a measure of stability.

The shelter 20 is supported on vertical pole 22, and is held in an elevated position on the pole 22, by a clamp or flange 26. Flange 26 may comprise a removable clamp having two opposed halves held together on pole 22 by appropriate fasteners, such as bolts 25, 27. Alternatively, flange 26 may comprise a circular flange permanently fixed, as by welding or the like to pole 22. Pole 22 is preferably comprised of a high strength, rigid material, such as steel.

Figure 10:
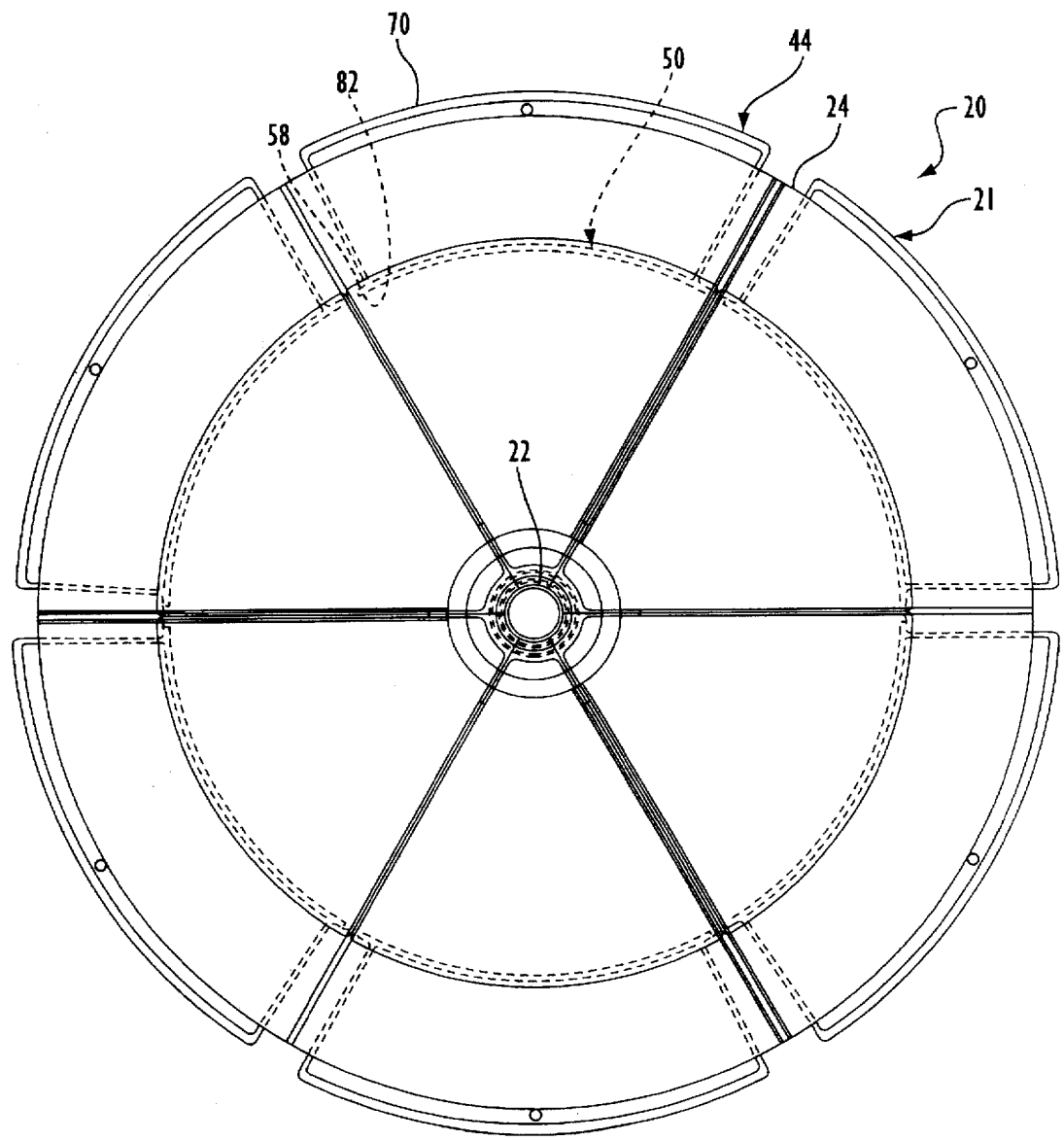
FIG. 10 is a top view of a bird shelter assembly according to the present invention configured as a multi-compartment bird house.

Shelter 20 further comprises a plurality of individual bird nesting modules 44 arranged circumferentially in side by side fashion around pole 22 so as to form a tier of nesting compartments 21. (See also FIG. 10) Each nesting module 44 includes an opening 86 to permit ingress and egress to and from the nesting compartment by the bird. A roof structure 24 covers the tier of nesting compartments 21. The roof structure preferably includes a central hole therethrough for allowing the pole 22 to pass. Roof structure 24 is held in place by a roof retaining element 28, which may comprise a removable clamp composed of opposed halves held together on the pole 22 by appropriate fasteners.

Figure 2:
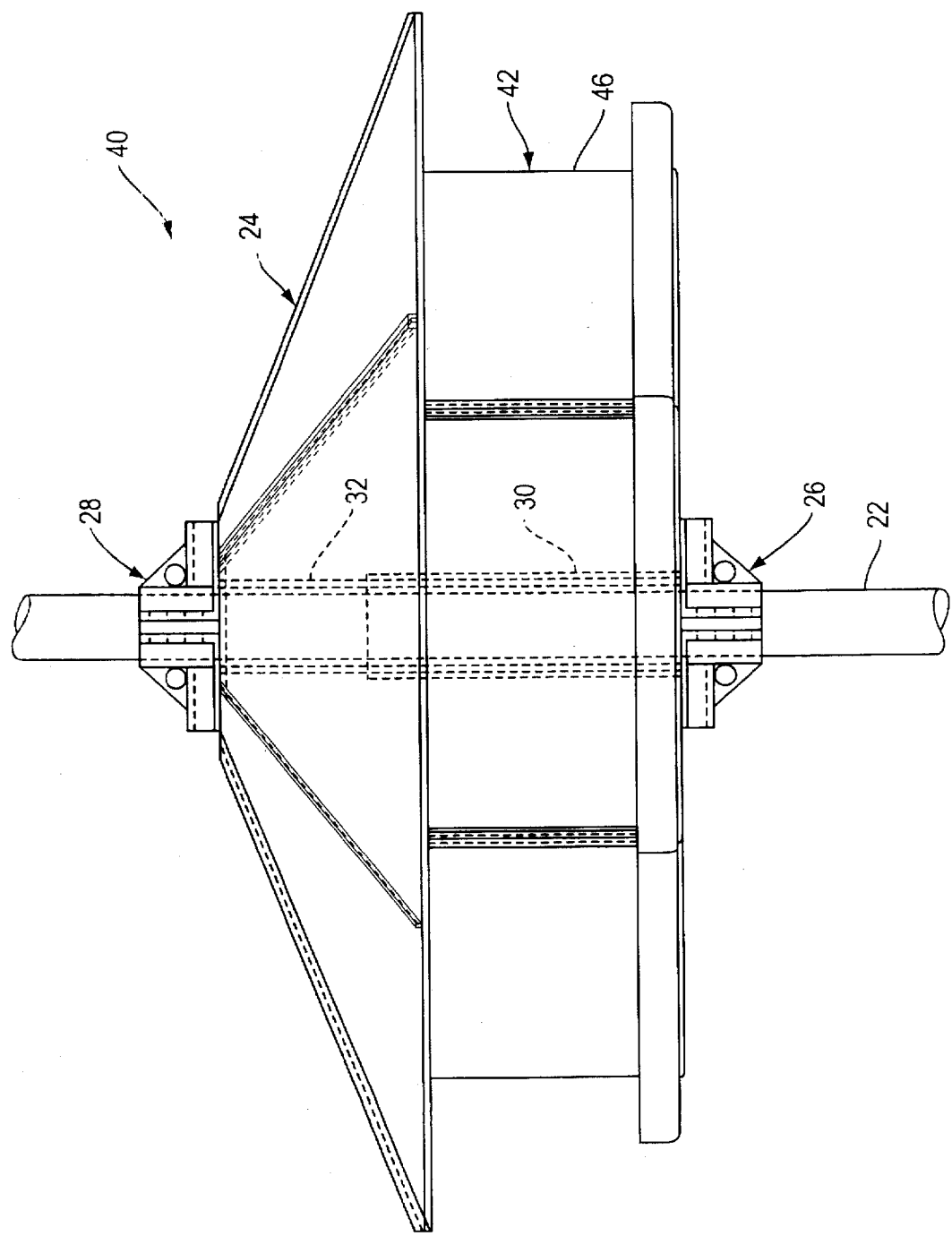
FIG. 2 is an elevational view of a modular bird shelter assembly according to the present invention, configured as a multi-compartment, single tier bird feeder.
Figure 4:
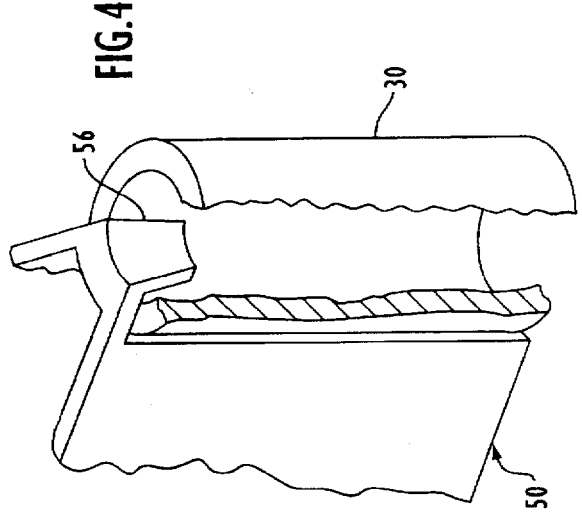
FIG. 4 is a partial perspective view showing a mounting hook of an individual compartment module engaged with a spacer element.
Figure 3C:
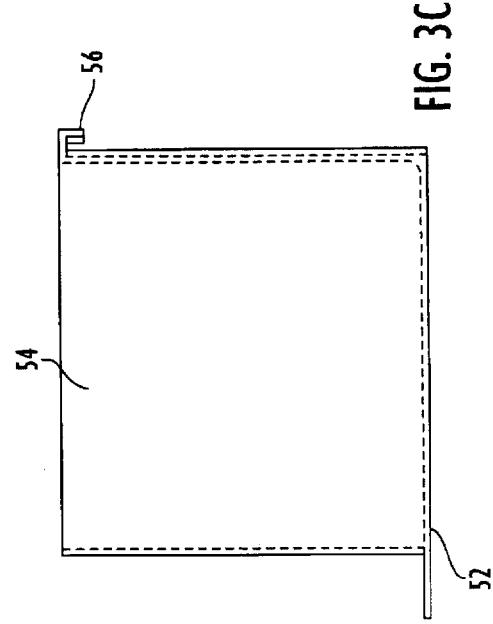
FIGS. 3A-3C are top, front and side views, respectively, of a compartment module of a modular bird shelter assembly according to the present invention.
Figure 3A:
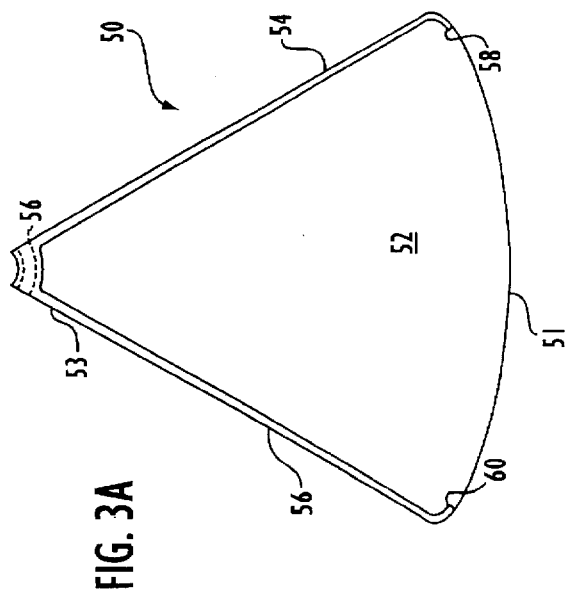
Figure 3B:
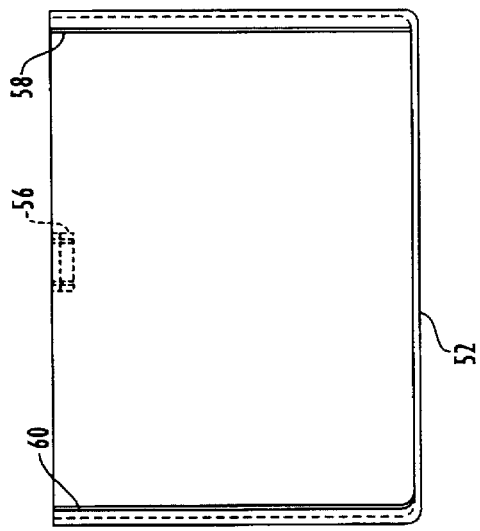
Figure 9:
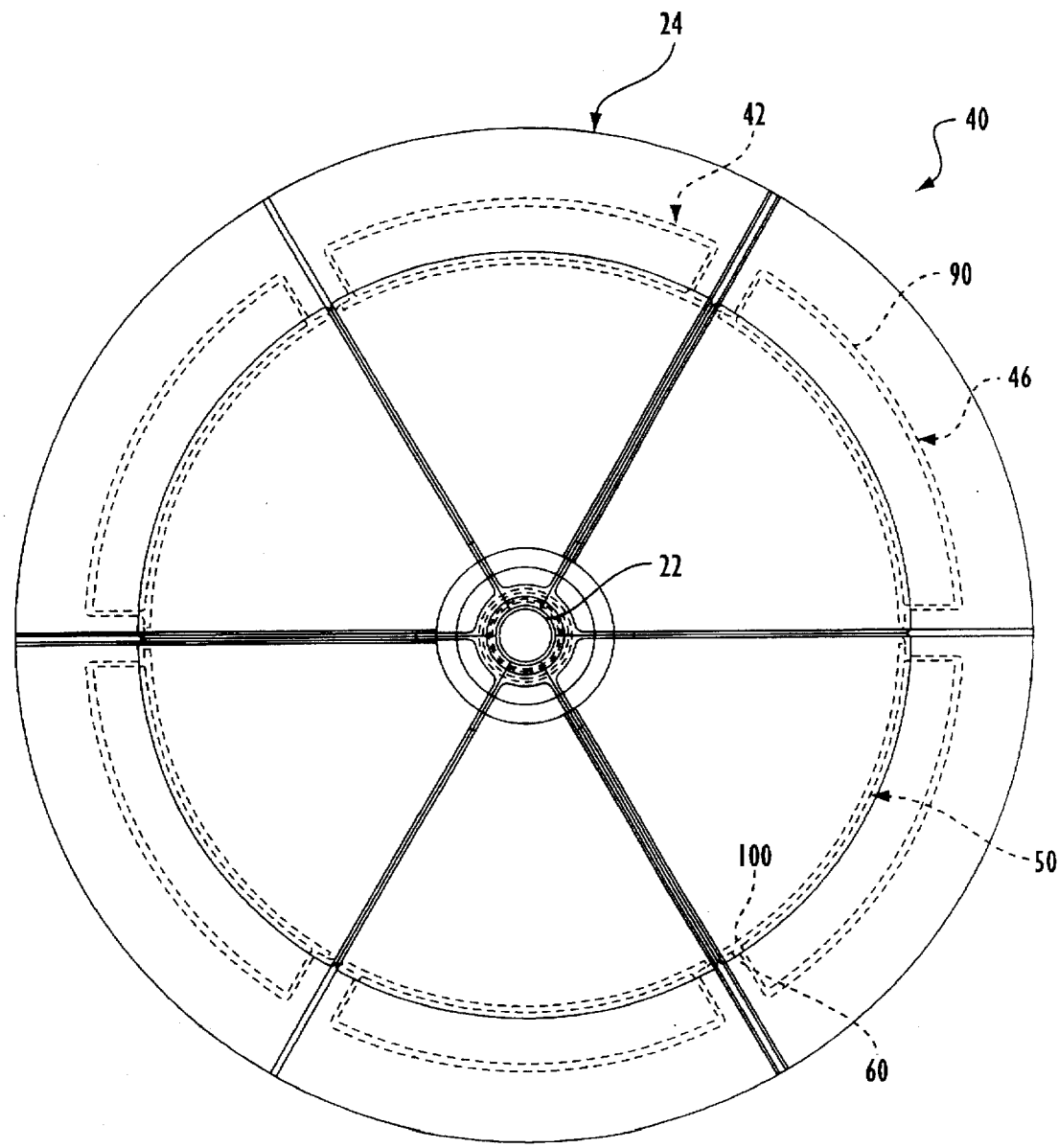
FIG. 9 is a top view of a bird shelter assembly according to the present invention configured as a multi-compartment bird feeder.

A modular bird shelter 40 according to the present invention, configured as a multi-compartment, single-tiered bird feeder is shown in FIG. 2. The shelter 40 comprises a plurality of individual bird feeder modules 46 arranged circumferentially around the pole 22 in side by side fashion so as to form tier 42. (See also FIG. 9).

The details of the nesting compartment modules 44 and the bird feeding compartment modules 46 are now described with reference to FIGS. 3 and 5-8. Each individual nesting and feeding compartment module includes a compartment module 50, shown in FIGS. 3A-3C. Compartment 50 is pie-shaped and includes side walls 54 and 56 disposed in a diverging spaced apart relation, and a bottom panel 52. Compartment module 50 further includes front panel engaging flanges 58 and 60.

Compartment module 50 has an inner end 53, which, when compartment module 50 is arranged circumferentially with other like compartment modules around a mounting pole 22, is disposed proximately to the mounting pole, and an outer end 51 which extends radially outwardly from the mounting pole when the compartment module 50 is arranged around the mounting pole.

Compartment module 50 further includes a mounting hook 56 extending inwardly and downwardly from an upper portion of the inner end 53 of the compartment module 50. The function of the mounting hook 56 will be described in more detail below.

Figure 5C:
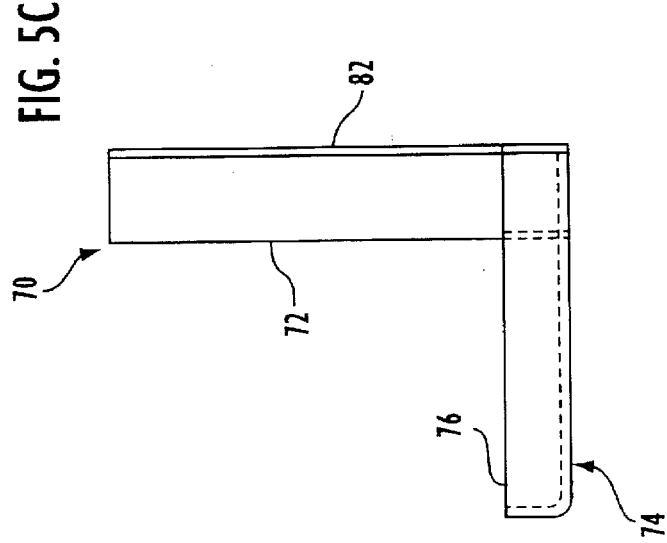
FIGS. 5A-5C are top, front and side views, respectively, of a bird house front panel.
Figure 5A:
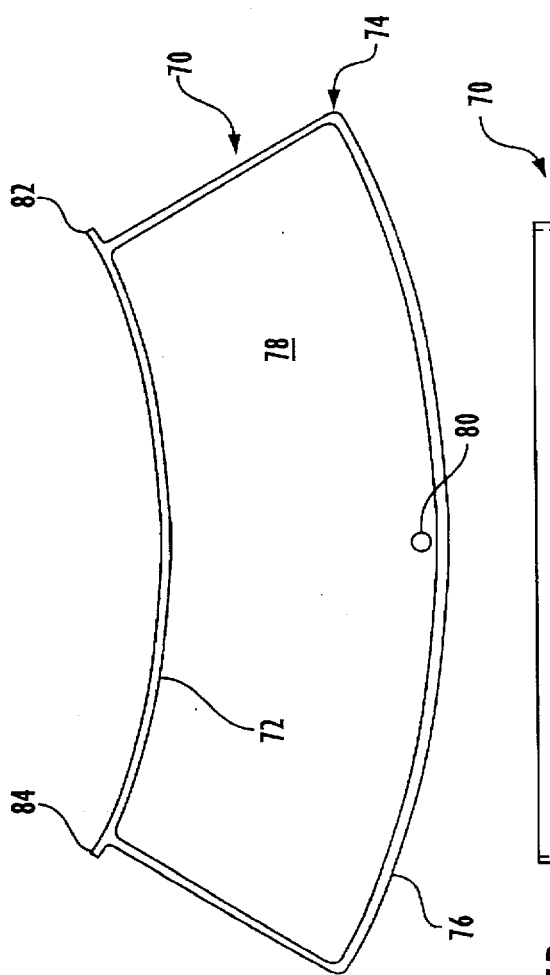
Figure 5B:
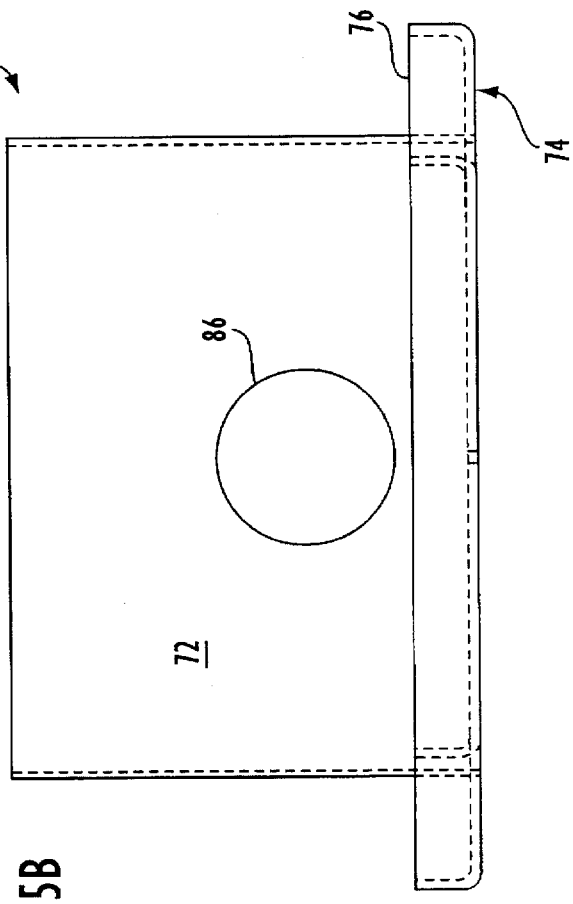

Compartment module 50 is convertible into a bird nesting compartment module by inserting a bird house front panel 70 (see FIGS. 5A-5C) or a bird feeder compartment module by inserting a bird feeder front panel 90 (see FIGS. 6A-6C) into the outer end 51 of the compartment module 50. As shown in FIGS. 5A-5C, bird house front panel 70 includes a front wall 72 and compartment module engaging flanges 82 and 84. Formed in front wall 72 is a hole 86, preferably round, which, when front panel 70 is installed into compartment module 50, provides ingress and egress into the bird house compartment module 44. Bird house front panel 70 includes a perch 74 extending outwardly from the bottom portion of front wall 72. Perch 74 includes a bottom surface 78 surrounded by upstanding substantially vertical walls 76 extending around three sides of the perch 74. Finally, perch 74 preferably includes a drainage hole 80 is formed in bottom surface 78 to prevent water accumulation in the perch 74.

Figure 6C:
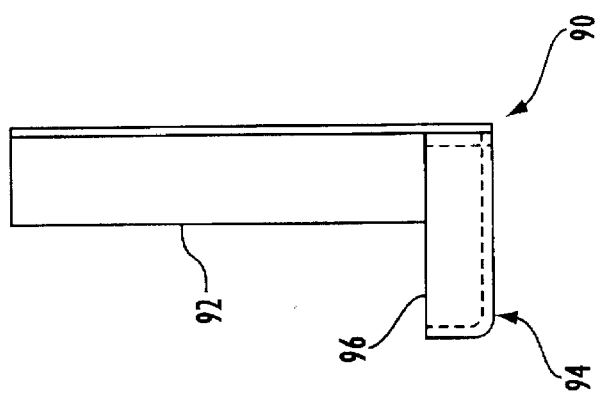
FIGS. 6A-6C are top, front and side views, respectively, of a bird feeder front panel.
Figure 6A:
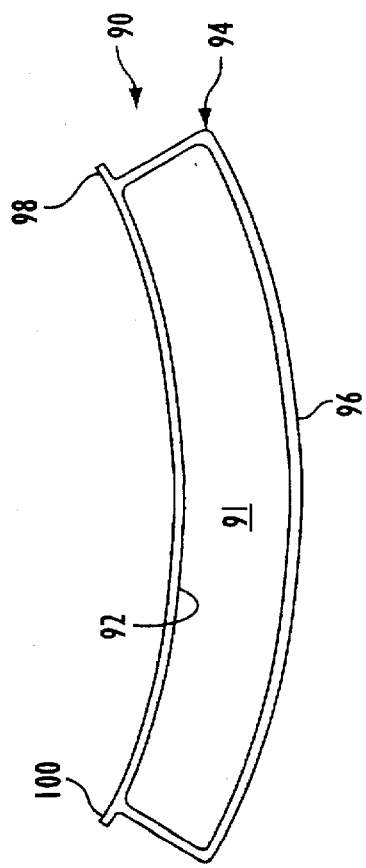
Figure 6B:
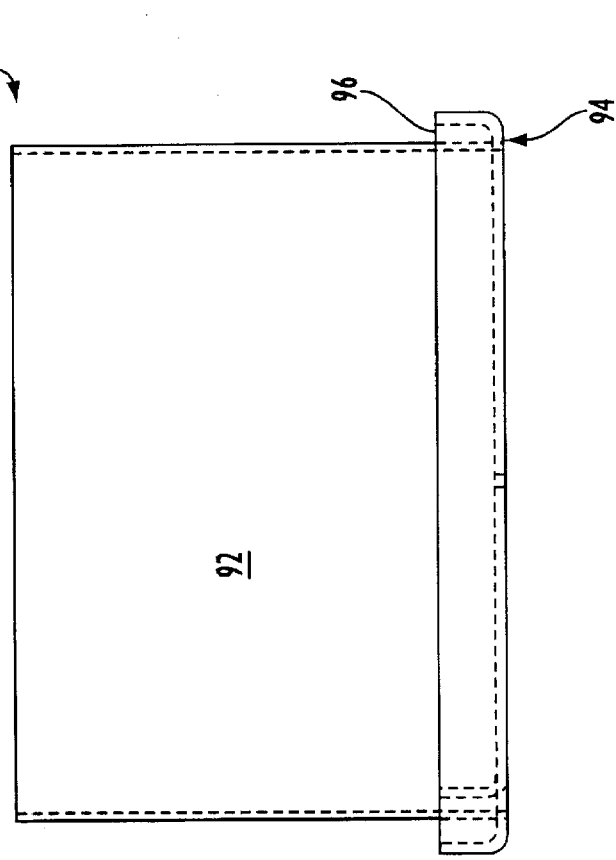

As shown in FIGS. 6A–6C, bird feeder front panel 90 includes a front wall 92 and compartment module engaging flanges 98 and 100. Bird feeder front panel 90 further includes a trough 94 extending outwardly from the bottom portion of the front wall 92. Trough 94 includes a bottom surface 91 surrounded on three sides by substantially vertical upstanding walls 96.

All components of the bird shelter 20, with the exception of pole 22, are preferably comprised of molded PVC plastic.

Figure 7:
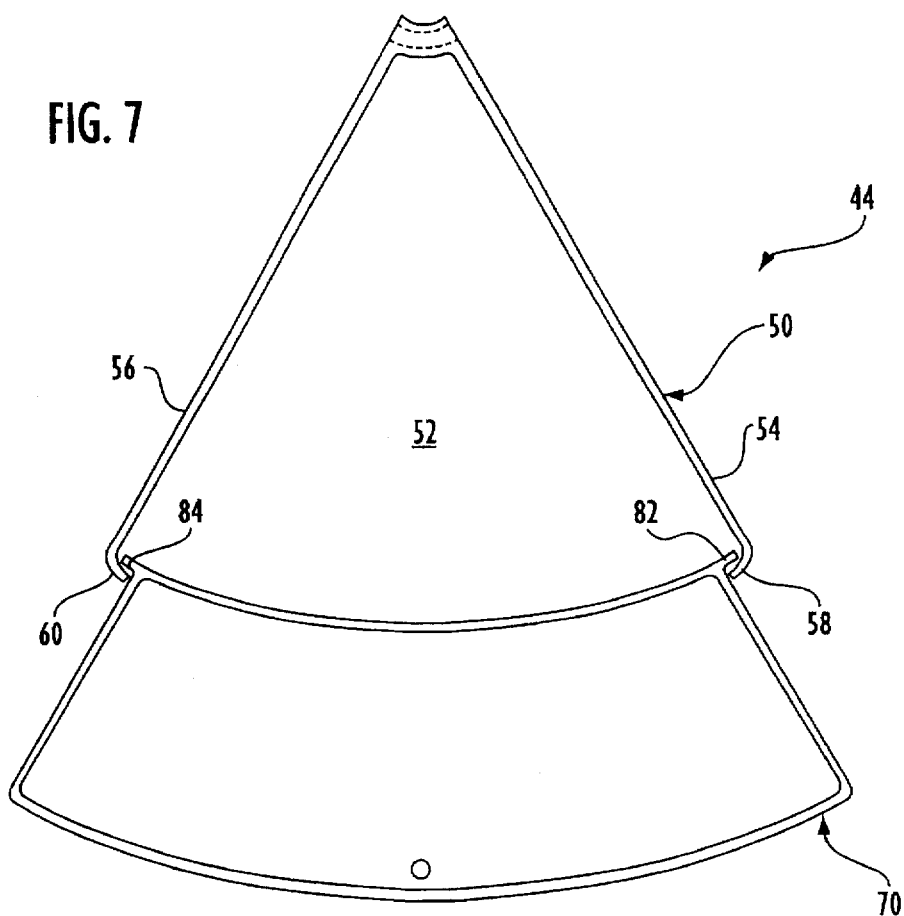
FIG. 7 is a top view of an individual compartment module having a bird house front panel coupled therewith.
Figure 8:
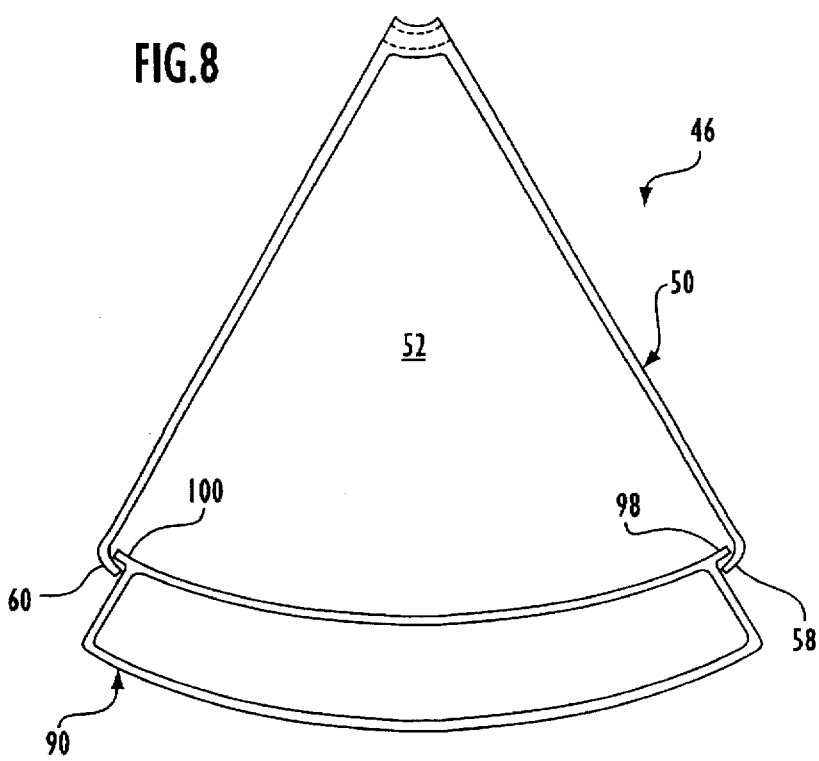
FIG. 8 is a top view of an individual compartment module having a bird feeder front panel coupled therewith.

Bird house front panel 70 and bird feeder front panel 90 are coupled with compartment module 50 as shown in FIGS. 7 and 8. As shown in FIG. 7, bird house front panel 70 is coupled with compartment module 50 by sliding panel 70 downwardly such that flanges 82 and 84 of front panel 70 are engaged behind flanges 58 and 60, respectively, of compartment module 50. Similarly, as shown in FIG. 8, bird feeder front panel 90 is coupled with compartment module 50 by sliding front panel 90 downwardly such that flanges 98 and 100 of front panel 90 are engaged behind panels 58 and 60, respectively, of compartment module 50.

A tier of compartments is constructed by first placing a spacer tube 30 (see FIGS. 1 and 11) over pole 22 such that spacer tube 30 rests upon clamp 26. The inside diameter of spacer tube 30 is larger than the outside diameter of pole 22 so that an annular gap 34 is formed between pole 22 and spacer tube 30.

Figure 11:
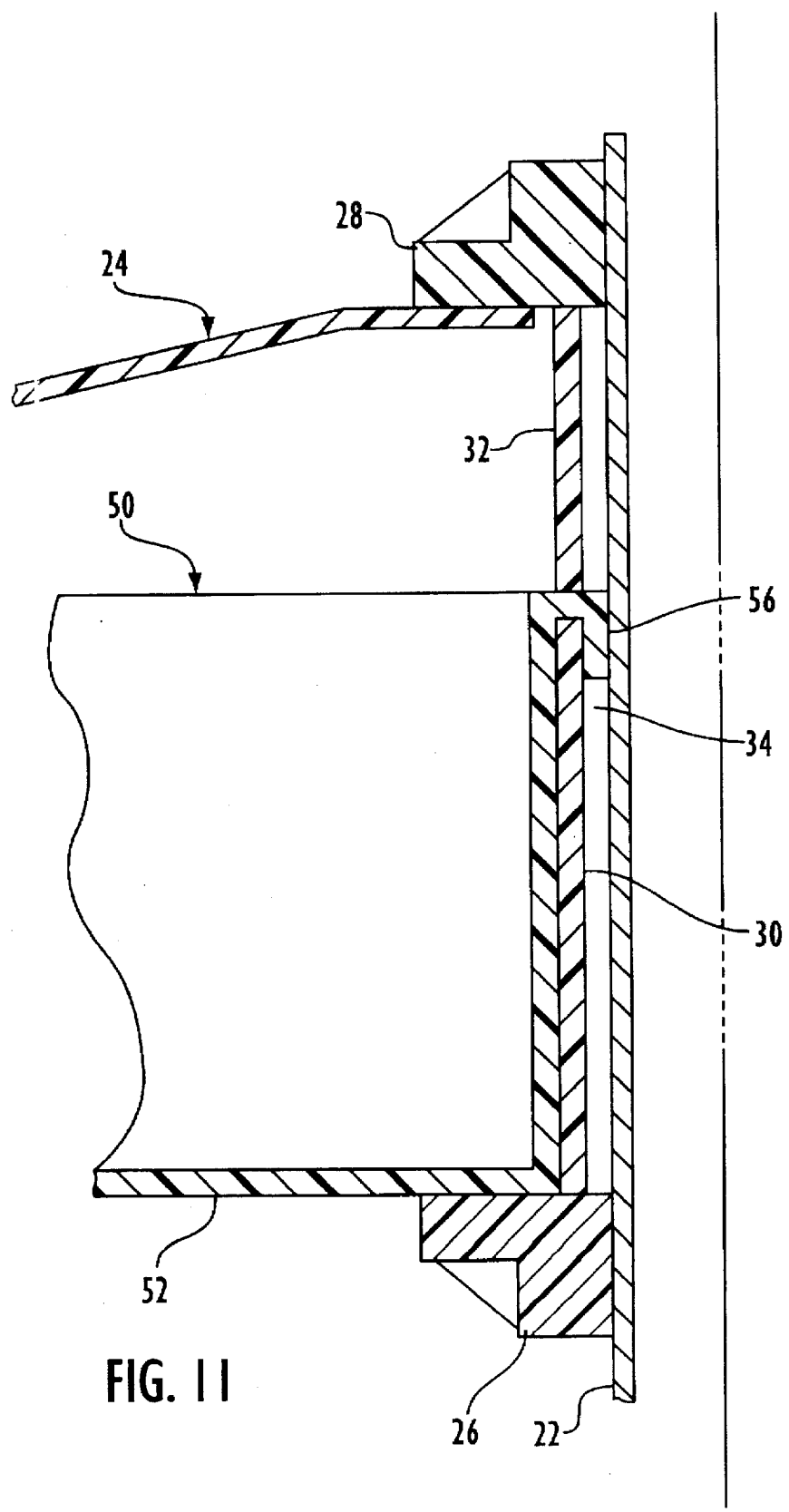
FIG. 11 is a partial cross-section of the bird shelter assembly of the present invention configured as a single-level shelter along the line XI—XI in FIG. 1.
Figure 12:
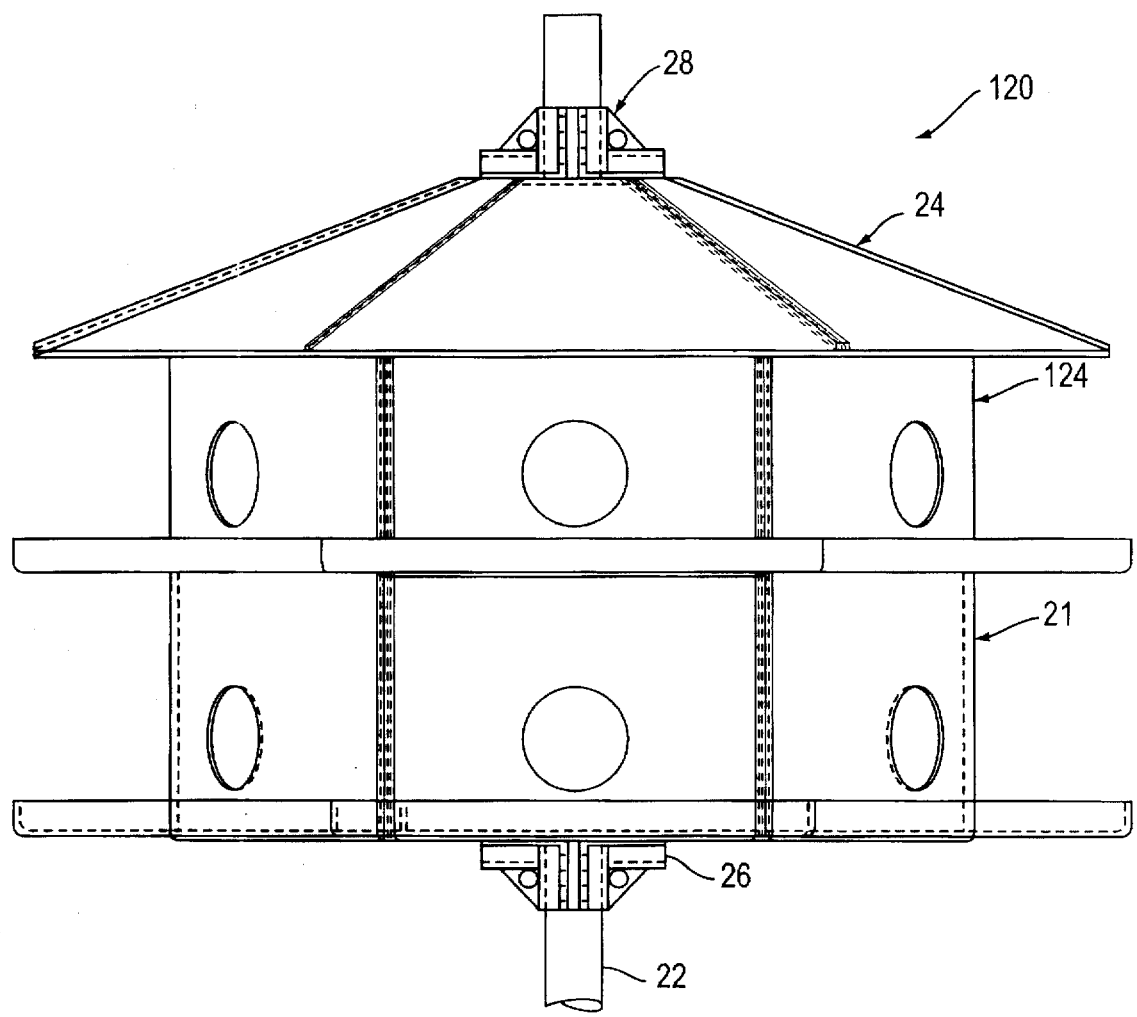
FIG. 12 is an elevational view of a bird shelter assembly according to the present invention configured as a double-tiered multi-compartment bird house.

A compartment module 50 is installed by engaging mounting hook 56 thereof into the gap 34 between spacer tube 30 and mounting pole 22. As shown in FIG. 11, the length of spacer tube 30 is preferably such that when mounting hook 56 of the compartment module 50 is engaged with gap 34, the bottom 52 of compartment module 50 rests upon the top of flange 26.

The plurality of like sized and shaped compartment modules are similarly installed in side-by-side fashion so as to form a circular tier of compartment modules around pole 22.

Subsequent tiers of compartment modules may be installed one above the other by placing successive spacer tubes 30 over pole 22 such that the spacer tube 30 rests atop the inner ends of the compartment modules forming the tier of modules located adjacently below. With a subsequent spacer tube 32 resting atop a tier of compartment modules, a plurality of compartment modules may be installed in side-by-side fashion by hooking their individual mounting hooks into the gap formed between spacer tube 32 and pole 22, thus forming a subsequent tier of compartments.

Roof structure 24 is preferably a plastic conical structure. The roof structure 24 is installed by first placing a roof spacer tube 32 (see FIGS. 1 and 11) over mounting pole 22 such that roof spacer tube 32 rests atop the uppermost tier of compartment modules. Roof structure 24 is then placed over mounting pole 22 so as to rest upon the outer peripheral edges of the uppermost tier of compartment modules. As shown in FIG. 11, the length of roof spacing tube 32 is such as to compensate for the height of the crown of roof structure 24 above the top of the uppermost tier of compartments. Roof structure 24 is held in place by roof retaining element 28, as described above.

As can be appreciated from the above description, the multi-compartment bird feeder/bird house structure of the present invention is easily assembled and disassembled and is easily converted from a multi-compartment bird house to a multi-compartment bird feeder.

It will be realized that the foregoing preferred specific embodiment of the present invention has been shown and described for the purpose of illustrating the functional and structural principles of this invention and are subject to change without departure from such principles. Therefore, this invention includes all modifications encompassed within the spirit and scope of the following claims.

What is claimed is:

1. A modular bird shelter assembly comprising:

an elongated support member constructed and arranged to extend vertically at a mounting site;

a shelter;

a shelter supporting structure constructed and arranged to be attachable to said elongated support member at a position thereon which constitutes an end portion thereof when at the mounting site;

said shelter including a plurality of compartment modules having respective inner and outer ends, said plurality of compartment modules being constructed and arranged to be supported by said shelter supporting structure in side by side fashion around a periphery of said elongated support member with the outer ends of said compartment modules facing radially outwardly from said elongated support member so as to form one or more tiers of compartments suitable to accommodate a plurality of birds;

a compartment module mounting structure constructed and arranged to fixedly secure said plurality of compartment modules in supported relation on said shelter supporting structure around the periphery of said elongated support member, said compartment module mounting structure comprising:

a spacer element associated with each tier of said one or more tiers of compartments, said spacer element being constructed and arranged to fit around said elongated support member so as to define a peripheral space between an inner surface of said spacer element and an outer surface of said elongated support member; and a support hook extending radially inwardly from an upper portion of said inner end of each compartment module, each of said support hooks being constructed and arranged to be disposed downwardly within said peripheral space to couple each compartment module between said spacer element and said elongated support member so that said outer end of each compartment module extends radially outwardly from said elongated support member;

a roof structure defining an opening through a center portion thereof through which said elongated support member extends, said roof structure being constructed and arranged to cover the top-most tier of said one or more tiers of compartments and to retain said one or more tiers of compartments in a fixed position on said elongated support member; and a roof structure retaining element constructed and arranged to be attachable to said elongated support member above said roof structure and constructed and arranged to retain said roof structure in a position to cover said one or more tiers and to retain said roof structure and said one or more tiers in a fixed position with respect to said elongated support member between said shelter supporting structure and said roof structure retaining element when said roof structure retaining element is attached to said elongated support member.

2. The modular bird shelter of claim 1 wherein each compartment module is comprised of a modular element and a bird house closure panel, which includes an opening formed therein to allow ingress and egress by a bird into and from said compartment module, or a bird feeder closure panel, which includes a solid wall portion and a trough structure constructed and arranged to hold bird food and to provide a feeding perch for the bird, said bird house closure panel and said bird feeder closure panel being constructed and arranged to be attachable to said modular element, and wherein each compartment module is convertible between (1) a feeding compartment configuration in which said bird feeder closure panel is attached to said module element, and (2) a bird house configuration in which said bird house closure panel is attached to said module element.

3. The modular bird shelter of claim 1 wherein:

said plurality of compartment modules supported by said shelter supporting structure in side by side fashion around the periphery of said elongated support member defines more than one tier of compartments, said spacer element associated with a bottom-most tier of said more than one tier is supported on said elongated support member by said shelter supporting element, and said spacer element associated with each tier of compartments of said more than one tier of compartments disposed above said bottom-most tier of compartments is supported on said elongated support member by a tier of compartments disposed adjacently below said associated tier of compartments above said bottom-most tier.

4. The modular bird shelter of claim 1, wherein each said compartment module of said plurality of compartment modules comprises:

two vertical side walls disposed in a spaced relation and diverging from said inner end of said compartment module toward said outer end of said compartment module, each of said walls having respective inner and outer ends;

a bottom panel;

two panel engaging flanges disposed at said outer end of each of said two vertical side walls; and a front panel including a front wall portion with module engaging flanges disposed at opposite sides thereof, said module engaging flanges constructed and arranged to engage said panel engaging flanges to secure said front panel to said vertical side walls.

5. A plurality of interfitting components capable of forming a shelter assembly for birds, said components comprising:

an elongated support member constructed and arranged to extend vertically at a mounting site;

a shelter supporting structure constructed and arranged to be attachable to said elongated support member at a position thereon which constitutes an end portion thereof when at the mounting site;

a plurality of compartment modules having respective inner and outer ends, said plurality of compartment modules being constructed and arranged to be supported by said shelter supporting structure in side by side fashion around a periphery of said elongated support member with the outer ends of said compartment modules facing radially outwardly from said elongated support member so as to define one or more tiers of compartments suitable to accommodate a plurality of birds;

a compartment module mounting structure constructed and arranged to fixedly secure said plurality of compartment modules in supported relation on said shelter supporting structure around the periphery of said elongated support member;

a roof structure defining an opening through a center portion thereof through which said elongated support member extends, said roof structure being constructed and arranged to cover a top-most tier of said one or more tiers of compartments and to retain said one or more tiers of compartments in a fixed position with respect to said elongated support member; and a roof structure retaining element constructed and arranged to be attachable to said elongated support member above said roof structure and constructed and arranged to retain said roof structure in a position to cover said top-most tier and to retain said roof structure and said one or more tiers in a fixed position with respect to said elongated support member between said shelter supporting structure and said roof structure retaining element when said roof structure retaining element is attached to said elongated support member.

6. The plurality of interfitting components of claim 5 wherein said compartment module mounting structure comprises:

a spacer element associated with each tier of said one or more tiers of compartments, said spacer element being constructed and arranged to fit around said elongated support member so as to define a peripheral space between an inner surface of said spacer element and an outer surface of said elongated support member; and a support hook extending radially inwardly from an upper portion of said inner end of each compartment module, each of said support hooks being constructed and arranged to be disposed downwardly within said peripheral space to couple each compartment module between said spacer element and said elongated support member so that said outer end of each compartment module extends radially outwardly from said elongated support member.

* * * * *